United States Patent [19]

Laipply

[11] Patent Number: 4,889,368
[45] Date of Patent: Dec. 26, 1989

[54] COMBINATION QUICK-CONNECT AND THREAD-DISCONNECT TUBE CONNECTOR

[75] Inventor: Robert A. Laipply, Jackson, Mich.

[73] Assignee: Aeroquip Corporation, Jackson, Mich.

[21] Appl. No.: 282,697

[22] Filed: Dec. 12, 1988

[51] Int. Cl.[4] ............................................. F16L 17/02
[52] U.S. Cl. ..................................... 285/18; 285/321; 285/354; 285/924; 285/921
[58] Field of Search ................ 285/321, 921, 924, 354, 285/18

[56] References Cited

U.S. PATENT DOCUMENTS

| | | | |
|---|---|---|---|
| 2,163,810 | 6/1939 | Raybould | 285/354 X |
| 2,226,826 | 12/1940 | Miller | 285/321 X |
| 2,374,348 | 4/1945 | Harding | 285/18 X |
| 2,535,694 | 12/1950 | Payne | 285/354 X |
| 3,398,977 | 8/1968 | Yoneda | 285/321 X |
| 3,929,356 | 12/1975 | DeVincent et al. | 285/924 X |
| 4,191,408 | 3/1980 | Acker | 285/321 X |
| 4,278,276 | 7/1981 | Ekman | 285/354 X |
| 4,549,755 | 10/1985 | Kot et al. | 285/354 X |
| 4,743,051 | 5/1988 | Proni | 285/921 X |
| 4,750,765 | 6/1988 | Cassidy et al. | 285/924 X |

FOREIGN PATENT DOCUMENTS

| | | | |
|---|---|---|---|
| 1274276 | 9/1961 | France | 285/354 |
| 93670 | 3/1959 | Norway | 285/354 |

*Primary Examiner*—Thomas F. Callaghan
*Attorney, Agent, or Firm*—Beaman & Beaman

[57] ABSTRACT

A fluid coupling particularly suitable for use with pressurized systems such as refrigeration circuits wherein the coupling parts may be quickly interconnected solely by axial insertion of the male part into the female part. Yet separation of the parts is controlled by a threaded nut. An annular radially expandable and contractible retainer ring is axially positioned relative to the female part by a nut threaded on the female part and the male part includes an annular shoulder which radially expands the retainer during insertion into the female part. Upon complete insertion of the male part the retainer engages the shoulder and prevents withdrawal of the male part due to abutment of the retainer against the nut. The nut includes a retainer engaging surface for reinforcing the retainer configuration, while in another embodiment the nut aids in withdrawing the male part from the female part during uncoupling.

6 Claims, 1 Drawing Sheet

U.S. Patent
Dec. 26, 1989
4,889,368
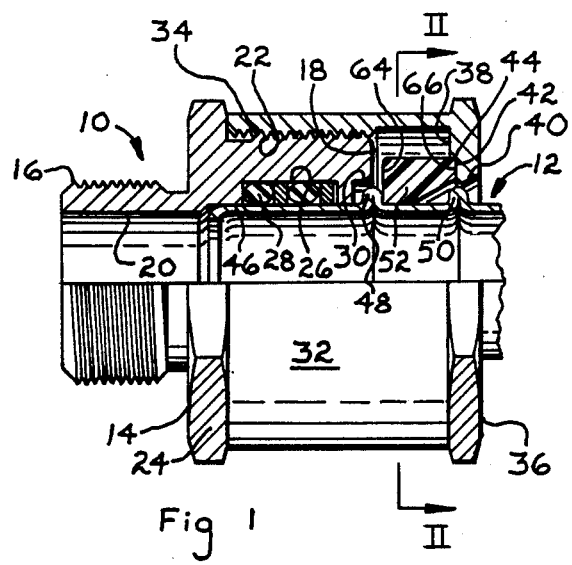
Fig 1
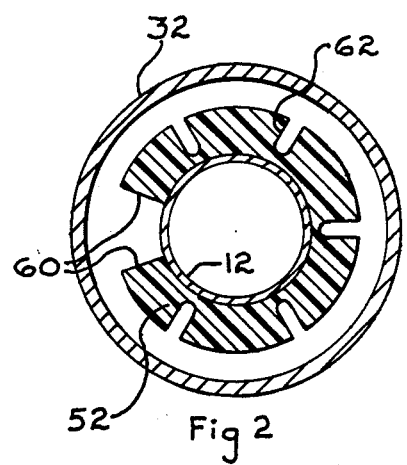
Fig 2
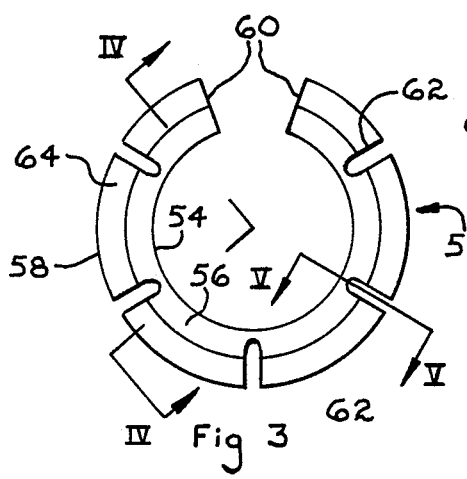
Fig 3
Fig 5
Fig 4
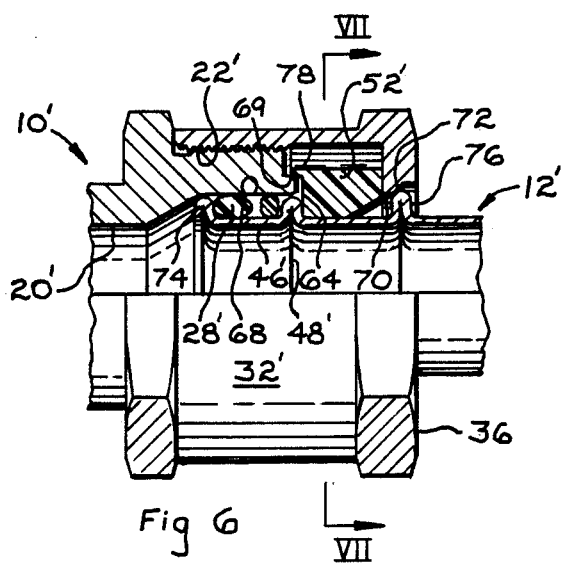
Fig 6
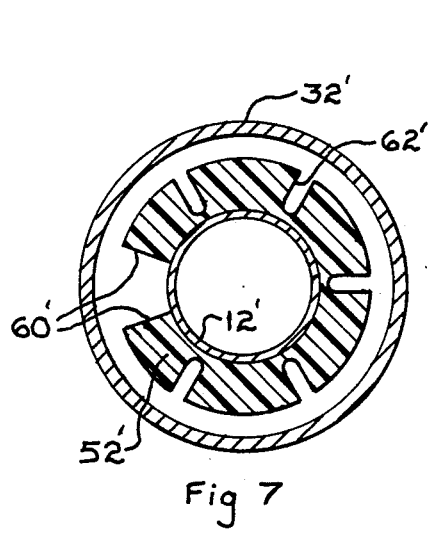
Fig 7

COMBINATION QUICK-CONNECT AND THREAD-DISCONNECT TUBE CONNECTOR

BACKGROUND OF THE INVENTION

Fluid couplings wherein the male and female parts are interconnected solely by axial displacement of the parts have the advantage of permitting the parts to be very quickly coupled, and such couplings are often described as "push-to-connect" couplings. In such couplings a shoulder is usually defined upon the male part engaging with a retainer, often resilient spring fingers, mounted on the female part which engage the male part shoulder upon the parts being fully coupled.

While such couplings using spring biased fingers or clips are capable of producing a fluid-tight connection quickly, disadvantages occur when the parts are separated. To separate couplings utilizing spring finger retainers the fingers must be removed from the male part shoulder, and such occurrence removes any restraint against separation of the coupling parts. If the fluid system in which a coupling is utilized is under pressure during uncoupling the parts will blow apart producing a dangerous condition with respect to the safety of the operator, and there is need for a push-to-connect coupling which controls the axial position of the coupling parts during separation thereof.

It is an object of the invention to provide a fluid coupling having male and female parts wherein the parts may be coupled using an axial push-to-connect movement, and yet separation of the parts is positively controlled and the parts cannot be rapidly forced apart even if the fluid system is under pressure.

Another object of the invention is to provide a combination push-to-connect and threaded nut coupling wherein initial connection and communication between the parts occurs by axial displacement of the parts and final connection, and separation of the parts, is controlled by a threaded nut type lock.

Another object of the invention is to provide a concise fluid coupling having the advantages of a push-to-connect coupling motion and the advantages of a nut controlled separation of the coupling parts.

In the practice of the invention a female coupling part includes a passage which receives the nose of the male part. Elastomeric sealing rings interposed between the parts produces fluid-tight sealing when the parts are fully coupled. The female part includes exterior threads receiving a nut having a radially depending flange in which a central opening is defined through which the male part is inserted. The male part includes a radial shoulder defined thereon axially set back from the nose and this shoulder, when the parts are fully coupled, is located in substantial radial alignment with the open end of the female part.

A radially expandable and contractible retainer in the form of a ring is located between the open end of the female part body and the nut flange. This ring is engaged by the male part shoulder during insertion of the male part through the nut flange opening and expands to permit the shoulder to pass therethrough. Once the shoulder passes through the retainer the retainer contracts to engage the back side of the shoulder, and the diameter of the retainer is larger than the flange central opening such that the opposite end of the retainer will engage the inside surface of the nut flange.

The retainer and nut will prevent withdrawal of the male part from the female part passage, and withdrawal is only permitted as the nut is unthreaded with respect to the female part. Thus, with a pressurized system the internal force acting upon the coupling parts tending to separate them is resisted by the retainer and nut and control of the separation of the parts is determined by the axial position of the nut on the female part.

The use of the invention permits the coupling parts to be slowly separated, and if the fluid coupling is being used in a pressurized circuit, for instance, such as found in refrigerators or air conditioners, the parts may be permitted to separate sufficiently to break the seal and permit the circuit to bleed and depressurize prior to the coupling parts being fully disconnected.

In an embodiment of the invention particularly suitable for low-pressure fluid circuits, the sealing rings are mounted upon the nose of the male part, and a second shoulder is defined upon the male part having an outer diameter greater than the diameter of the nut flange central opening. Thus, unthreading of the nut causes the flange to engage the male part second shoulder and mechanically withdraws the male part from the female part passage as the nut is unthreaded. As the retainer is of a flexible nature with respect to radial deformation the components of the coupling may be reused innumerable times without damage or significant wear thereto.

BRIEF DESCRIPTION OF THE DRAWINGS

The aforementioned objects and advantages of the invention will be appreciated from the following description and accompanying drawings wherein:

FIG. 1 is an elevational view, partially sectioned, illustrating a fluid coupling constructed in accord with the invention showing the female and male parts fully interconnected, FIG. 2 is an elevational, sectional view taken along Section II—II of FIG. 1, FIG. 3 is an elevational view of the retainer ring, per se, FIG. 4 is an elevational view, partially sectioned, as taken along Section IV—IV of FIG. 3, FIG. 5 is an elevational, sectional view as taken along Section V—V of FIG. 3, FIG. 6 is an elevational, partially sectioned, view of another embodiment of the invention as used with low pressure fluid circuits illustrating the components in the fully connected relationship, and FIG. 7 is an elevational, sectional view as taken along Section VII—VII of FIG. 6.

DESCRIPTION OF THE PREFERRED EMBODIMENTS

With reference to FIGS. 1-5, the coupling includes a female part generally indicated at 10 adapted to receive the male part generally indicated at 12 which is, basically, in the form of a tube. The female part includes an annular body 14 having a threaded connection end 16 wherein the body 14 may be attached to a hose fitting, adapter, or the like associated with the fluid system, not shown, in which the coupling is incorporated. The other end of the body 14 includes the open end 18 and the axially extending passage 20 extends through the female body intersecting the ends thereof.

Body 14 is exteriorly threaded at 22 and includes wrench-engaging flats 24 hexagonally arranged whereby a wrench may be applied to the flats to turn the body during installation, or hold body 14 stationary. The passage 20 is recessed at 26 receiving an annular seal and spacer assembly 28, the seals permitting a fluid-tight connection to be made between the parts 10 and 12. Passage 20 is counterbored at 30 adjacent end 18.

An annular nut 32 is threaded at 34 within the nut skirt and the nut includes a radially extending flange 36 having an inner surface 38 and a circular central opening 40. The surface 38 is counterbored at 42 and the outermost radial dimension of the counterbore is defined by the circular axially extending ledge 44 concentric to the axis of the opening 40.

As previously indicated, the male part 12 is of a tubular construction and may constitute the end of a rigid tube or conduit. The male part 12 is cylindrical in configuration and includes a cylindrical nose 46 which, when the coupling is assembled, is sealingly engaged by the seals 28. An annular radially extending shoulder 48 is defined on the tube 12 axially spaced from the terminal end of the nose 46, and this radial upsetting of the tube material to form a shoulder is well known in the coupling arts. A second annular radially extending shoulder 50 is also defined in the male part 12 axially spaced from shoulder 48 in the opposite direction with respect to the nose.

Retainer 52, preferably formed of a synthetic plastic material, is of a generally ring-like configuration, and includes a cylindrical bore 54, FIG. 3. The retainer includes a tapered oblique surface 56 intersecting the bore 54, and the periphery of the retainer is indicated at 58. The retainer 52 is in the form of a split ring having radially extending ends 60 wherein the circumference of the ring may be expanded or contracted, and such expansion is aided by notches 62 extending from the periphery 58 toward the bore 54, but terminating short of the bore. The presence of the notches 62 renders the retainer more flexible than if the notches were not present. The retainer also includes an innermost radial end 64 and the opposite radial end 66 is disposed toward the flange 36.

Prior to coupling of the female part 10 with the male part 12, the retainer 52 is located adjacent the open end 18 and the nut 32 is placed over the female part open end and is threaded upon threads 22 until the nut skirt bottoms out on the shoulder defining the flats 24. Open end 18 will face retainer end 64 and surface 38 will face end 66. When the nut 32 is fully threaded upon the body 14 the axial spacing between the open end 18 and the inner surface 38 of the nut flange is slightly greater than the axial distance between the retainer ends 64 and 66. The axial spacing between the open end 18 and the flange surface 38 needs to be great enough so that the surfaces do not interfere with the radial expansion and contraction of the retainer 52 during connection of the coupling parts.

Thereupon, the nose 46 of the male part 12 is inserted through the nut flange opening 40 and engages the retainer oblique surface 56. This action will force the retainer against end 18 and circumferentially expand the retainer 52 as the nose 46 is pushed through the retainer, and further radial expansion of the retainer occurs as the shoulder 48 is forced through the retainer bore 54.

During this connection of the coupling parts the nose 46 is being received within the seals 28, and upon the shoulder 48 passing through the retainer bore 54 the natural resiliency of the retainer material will permit the retainer to fully contract into engagement with the surface of the male part 12 intermediate the shoulders 48 and 50. It will be appreciated that during the insertion of the male part that friction between the retainer and the male part will force the retainer 52 against the open end 18 assuring radial misalignment of the retainer with respect to the nut flange ledge 44 to permit expansion of the retainer.

The coupling parts 10 and 12 will be fully connected when shown in the position of FIG. 1, and shoulder 48 is received within counterbore 30. When the coupling parts 10 and 12 are fully coupled a sealed relationship between seals 28 and nose 46 is achieved, and the male part 12 cannot be withdrawn from the passage 22 as such axial movement is resisted by the retainer 32 abutting against the shoulder 48 and the nut flange 36. When the coupling is pressurized, or the parts 10 and 12 attempted to be separated, the retainer will be located "under" ledge 44 and prevented from expanding.

The male part shoulder 50, when the parts 10 and 12 are fully coupled, will be located within the flange central opening 40 and this relationship produces a visual condition readily observable by the installer indicating to the installer that the parts 10 and 12 are fully connected.

When it is desired to disconnect the coupling parts 10 and 12 the nut 32 is unloosened and the internal pressures within the coupling will maintain shoulder 48 in engagement with the retainer end 64 and as the nut 32 is unthreaded the nose 46 will slowly withdraw from the seal assembly 28. During this disconnection procedure under the control of the axial position of the nut 32 leakage will begin to occur between the nose 46 and the seals 28, and such leakage is desirous if the coupling is used in a refrigeration circuit to provide an inherent "bleeding" of the system to relieve the pressure therein. While the coupling is use, and under pressure during disconnection, the forces tending to separate the coupling parts will assure that the retainer end 66 is located within counterbore 42 and ledge 44 will prevent radial expansion of the retainer which would permit the shoulder 48 to pass through the retainer bore 54. The axial length of the threads 22 is great enough to permit the nose 46 to be completely removed from the seal assembly, and it will be appreciated that the use of the retainer 52 permits the relative axial position of the parts 10 and 12 to be fully predetermined and controlled during the uncoupling operation.

Accordingly, it will be appreciated that the structure of the invention utilizing the retainer 52 permits the parts 10 and 12 to initially be interconnected by a relatively axial movement quickly accomplished, while disconnection of the parts is under the control of the unloosening of the nut 32 and accidental disassembly or "blow apart" of the coupling parts is prevented.

After separation of parts 10 and 12 the nut 32 will now be mounted on part 12 and the parts can be easily reconnected by threading the nut on the part 10.

In the embodiment of FIG. 6 components similar to those previously described are indicated by primed reference numerals. The coupling shown in FIG. 6 is particularly suitable for use with low-pressure systems, while the embodiment shown in FIG. 1 is used with higher pressure fluid systems.

In the embodiment of FIG. 6 the passage of the female part 10', as shown at 20', is expanded to a greater diameter at 68, and the open end of the female body part includes an axially extending ledge 69 of cylindrical configuration.

The nut flange 36', includes the minimum diameter cylindrical opening 70 and an obliquely disposed recessed shoulder 72, for a purpose later described.

The male part 12', at its terminal end, includes an annular radially extending shoulder 74, and this shoulder together with the shoulder 48', defines a recess for receiving the annular seals 28', and it will be appreciated that the seals 28' are permanently mounted upon the nose 46'.

The retainer 52' is similar to the retainer previously described except that an axially extending lip 78 is defined thereon for resting upon the annular shelf 69.

In the embodiment of FIG. 6 the retainer 52' will be located adjacent the open end of the female part 10', and the nut flange 36', and the retainer 52' will be maintained in its contracted position by the engagement of the lip 78 with the shelf 69. Thus, the shelf and lip prevent the diameter of the bore of the retainer 52 from being less than a given dimension.

The diameter of the shoulders 74 and 48' is less than the diameter of the flange central opening 70, and the nose 46' of the male part 12' may be inserted into the bore of the retainer 52' expanding the retainer and permitting both of the shoulders 74 and 48' to be inserted through the retainer as the retainer is expanded. In its final position, after the shoulder 48' passes through the retainer 52', the retainer 52' will engage the back side of the shoulder 48', as shown in FIG. 6. It will be appreciated that in this normal operating condition of the coupling that the annular shoulder 76 defined on the male part 12 will be disposed adjacent the nut central opening 70 and shoulder 72.

The diameter of the shoulder 76 is greater than the diameter of the nut central opening 70, and in the normal operating condition the shoulder 76 will be located adjacent surface 72 but slightly axially spaced therefrom. The inner position of the retainer 52' between the shoulder 48' and the nut flange 36' prevents the male part 12' from withdrawing from the passage 68, and the coupling parts will be maintained in their fully coupled position as shown.

When it is desired to disconnect the coupling parts the nut 32' is unthreaded, and axial displacement of the nut 32' to the right, FIG. 6, causes the nut surface 72 to engage the shoulder 76 and physically force the withdrawal of the male part 12' from the passage of the female part 10'. Thus, with the species of FIG. 6 it is not necessary to utilize the internal pressure of the system to facilitate disconnection of the coupling parts. Continued loosening of the nut 32' will fully remove the nose 46' and shoulder 74 from the passage 68 and permit the coupling parts 10' and 12' to be separated.

Couplings constructed in accord with the aforedescription can be reused innumerable times as no damage to the components occurs during connection and disconnection of the coupling parts. The flexible nature of the retainer does not adversely affect the operation and strength characteristics thereof and with both embodiments of the invention the male part may be inserted into the female part solely by an axial relative displacement while disconnection requires unthreading and a controlled disconnection takes place which is safe and purposeful.

It is appreciated that various modifications to the inventive concepts may be apparent to those skilled in the art without departing from the spirit and scope of the invention.

I claim:

1. A push-to-connect coupling characterized by its control of the coupling parts during uncoupling comprising, in combination, an annular female part having a connection end, an open end and an axial passage interconnecting said ends and a coupler selectively axially positionable thereon having an abutment axially spaced from and in opposed relation to said open end, an annular male part having an axial passage, a nose and an exterior outwardly radially extending first shoulder axially spaced from said nose, said nose being axially insertable into said female part passage through said coupler and said open end, and a radially expandable and contractible axially displaceable retainer located intermediate said female part open end and said coupler abutment axially receiving and radially expanding over said male part nose and shoulder and contracting into abutting engagement with said shoulder, said retainer being operatively interposed between said shoulder and said abutment whereby said coupler maintains said male and female parts coupled and controls the relative axial position of said parts during separation, said retainer comprising an annular radially expandable and contractible ring formed of a semi-rigid synthetic plastic material, said coupler comprising a nut threaded upon said female part adjacent said open end concentric to said female part passage having a radially extending flange defining said abutment in axially spaced relationship to said open end, said flange including a counterbore recess having an inner surface facing said open end and a central opening concentric to said female part passage through which said male part nose and first shoulder are inserted during coupling, said counterbore recess being outwardly radially defined by an axially extending inwardly facing ledge substantially parallel to said female part passage, said ring including a periphery, and a portion of said ring periphery engaging said ledge when said ring is contracted preventing radial expansion of said ring.

2. In a push-to-connect coupling as in claim 1, elastomeric sealing means interposed between said female part passage and said male part nose upon said nose being received within said female part passage.

3. In a push-to-connect coupling as in claim 2, said sealing means comprising at least one annular ring mounted within a concentric recess defined in said female part passage.

4. In a push-to-connect coupling as in claim 2, said sealing means comprising at least one annular ring mounted upon said male part nose.

5. In a push-to-connect coupling as in claim 1, said ring including a circumference, said circumference being radially severed to permit said ring to radially expand and contract.

6. A push-to-connect coupling characterized by its control of the coupling parts during uncoupling comprising, in combination, an annular female part having a connection end, an open end and an axial passage interconnecting said ends and a coupler selectively axially positionable thereon having an abutment axially spaced from and in opposed relation to said open end, an annular male part having an axial passage, a nose and an exterior outwardly radially extending first shoulder axially spaced from said nose, said nose being axially insertable into said female part passage through said coupler and said open end, and a radially expandable and contractible axially displaceable retainer located intermediate said female part open end and said coupler abutment axially receiving and radially expanding over said male part nose and shoulder and contracting into abutting engagement with said shoulder, said retainer being operatively interposed between said shoulder and said abutment whereby said coupler maintains said male and female parts coupled and controls the relative axial position of said parts during separation, a radially extending second shoulder exteriorly defined on said male part axially spaced from said first shoulder away from said nose having an outer diameter, said coupler comprising a nut threaded upon said female part adjacent said open end concentric to said female part passage having a radially extending flange defining said abutment in axially spaced relationship to said open end, said flange including a central circular opening concentric to said female part passage through which said male part nose and first shoulder are inserted during coupling, the diameter of said central opening being less than the diameter of said second shoulder whereby upon unthreading of said nut upon said female part said flange engages said second shoulder to withdraw said male part from said female part passage.

* * * * *